United States Patent Office 3,786,132
Patented Jan. 15, 1974

3,786,132
METHOD FOR PREPARING CARBONYLS OF RUTHENIUM AND OSMIUM
John L. Dawes and Jerry D. Holmes, Longview, Tex., assignors to Eastman Kodak Company, Rochester, N.Y.
No Drawing. Filed July 11, 1972, Ser. No. 270,758
Int. Cl. C01g 1/04, 55/00
U.S. Cl. 423—417                              17 Claims

ABSTRACT OF THE DISCLOSURE

Carbonyls of the formula $M_3(CO)_{12}$, where M is ruthenium or osmium, are prepared by reacting a solution of a halide (such as a chloride, bromide, or iodide), a halide derivative, or a carbonyl halide of ruthenium or osmium in a first solvent with carbon monoxide at a temperature of from about 100° C. to about 150° C. at atmospheric pressure until a carbonyl halide complex is formed. A second solvent is then added in sufficient quantity to lower the boiling point of the resultant solution to less than 100° C. A quantity of zinc is added and the system is reacted with additional carbon monoxide at a temperature less than 100° C. until precipitation of the desired dodecacarbonyl is substantially complete. Each of the two solvents should preferably have the following properties.

(1) Act as a solvent for the starting halide of ruthenium or osmium;
(2) Not enter into the reaction; and
(3) Not act as a solvent for the dodecacarbonyl product.

In addition the first solvent should boil at a temperature between 100° C. and 150° C., and the second solvent should boil at a temperature of less than 100° C.

---

This invention relates to a method for preparing carbonyls of ruthenium and osmium containing the metal atoms bonded to each other and also to the carbonyl groups but containing no bridging carbonyl groups. These carbonyls, which may be represented by the formula $M_3(CO)_{12}$ where M is ruthenium or osmium, are air stable and soluble in organic solvents such as benzene or acetone. The ruthenium or osmium dodecacarbonyls are known to be useful as hydroformylation (oxo) type catalysts. Triruthenium dodecacarbonyl has been used for the synthesis of hydroquinone from the reaction of carbon monoxide and acetylene.

Heretofore, the dodecacarbonyls of the type indicated have been prepared by reacting halide salts with zinc and carbon monoxide at temperatures of less than 100° C. and pressures of from about 4 atmospheres to about 25 atmosphere pressure (see for example U.S. Pat. 3,514,-258). This process is commercially undesirable because of the expense and difficulty of obtaining the necessary high pressure equipment and of performing the reaction at elevated pressures.

Therefore, it is an object of this invention to provide a method of manufacturing dodecacarbonyls of the type indicated at atmospheric pressure.

A further object of this invention is to provide a process of manufacturing dodecacarbonyls of the type indicated which does not entail excessive reaction times.

Other objects and advantages will be apparent on consideration of the following specifications and claims.

It has now been discovered that surprisingly these dodecacarbonyls can be prepared at atmospheric pressure by a two-step reaction procedure. In accordance with the method of the invention a solution of a halide such as chloride, bromide, or iodide, a halide derivative such as ammonium hexabromoosmate, or a carbonyl halide of ruthenium or osmium is heated to a temperature of from about 100° C. to about 150° C. in the presence of a stream of carbon monoxide. A color change, indicating the formation of a carbonyl halide complex, will occur in the reaction medium when this first stage reaction is complete. The type and function of the solvent used is immaterial so long as it meets the following criteria: (1) it acts as a solvent for the ruthenium or osmium halide charged; (2) it does not enter into the reaction; (3) it boils at a temperature of from about 100° C. to about 150° C. preferably from about 105° C. to about 145° C. and (4) it preferably does not act as a solvent for the product dodecacarbonyl. Examples of such solvents include 2-ethoxyethanol, 2-methoxyethanol, 2-methoxy-1-propanol, 1-butanol, etc.

Following the above-referenced color change, which will normally occur in about 2 to 3 hours, a quantity of a second solvent is added to the solution sufficient to lower the boiling point of the total solution to below 100° C. and at least a stoichiometric amount of zinc is added. The resulting solution is further stirred and refluxed in the presence of additional carbon monoxide until formation of the desired dodecacarbonyl is complete. The crude product may then be isolated by filtration and purified by recrystallization from a suitable solvent such as toluene, benzene, methylene chloride, xylene, hexane, etc.

Again the type and function of the second solvent are not critical so long as it:

(1) acts as a solvent for the reactants;
(2) does not enter into the reaction; and
(3) boils at a temperature of less than 100° C.

Examples of suitable solvents include ethanol, methanol, isopropanol, etc.

The addition of the second solvent has two functions: (1) it lowers the reflux temperature of the second solution below 100° C., and (2) it washes the dodecacarbonyl product carried by the carbon monoxide stream back into the reaction vessel. When the solvent used is a nonsolvent for the dodecacarbonyl product the product may be readily removed from the reaction mixture by filtration. If the solvent used is at least a partial solvent for the dodecacarbonyl product the product may be recovered by evaporation of the solvent. The dodecacarbonyl product may also be purified if desired by sublimation or crystallization.

In a preferred embodiment of the invention ruthenium trichloride is dissolved in a high boiling alcohol such as 2-ethoxyethanol. The resultant solution is then reacted with carbon monoxide at 135° C. and atmospheric pressure. The solution turns from deep red to pale yellow without decomposition in from 2 to 3 hours. A quantity of ethanol equal in volume to the initial quantity of 2-ethoxyethanol and a quantity of granulated zinc equal in weight to the initial charge of ruthenium trichloride is then added to the solution. The resultant solution is stirred and refluxed with additional carbon monoxide until precipitation of orange triruthenium dodecacarbonyl is complete. The crude product is isolated by filtration and purified by recrystallization from toluene. The entire reaction is complete in less than 24 hours with yields in excess of 75% triruthenium dodecacarbonyl. This yield can be further improved by continuous operation of the process and by recycle of the carbonyl saturated solvent.

It was quite surprising to discover that ruthenium or osmium dodecacarbonyl could be prepared at atmospheric pressure with the reaction going substantially to completion. The key element to this discovery appears to be that in the absence of zinc an elevated temperature of between 100° C. and 150° C. can be utilized to form an intermediate metal carbonyl chloride complex which once formed can be reacted at lower temperatures with carbon monoxide in the presence of zinc to give the desired dodecacarbonyl.

If necessary or desirable the entire reaction can be conducted in a single solvent, which has the characteristics of:

(1) acting as a solvent for the reactants;
(2) not entering into the reaction; and
(3) boiling at a temperature of less than 100° C., but an excessive period of time is required. For example, when ruthenium trichloride is reacted using ethanol as a solvent approximately five days will be required. The first stage of reaction is very slow below 100° C. It has also been discovered that if the entire reaction is carried out at a temperature above 100° C. extensive decomposition will occur upon addition of the zinc. Thus, the use of a single solvent reaction system is not particularly attractive from a commercial standpoint.

Solvents which may be used in the method are organic solvents such as methanol, ethanol, 1,2-dimethoxyethane, 2-methoxyethanol, 2-ethoxyethanol, and higher aliphatic alcohols.

The invention is further illustrated by the following examples. It will be understood that these examples are illustrative only and are not intended to limit the invention in any way.

EXAMPLE 1

This example indicates a typical preparation of triruthenium dodecacarbonyl by the process of the invention.

Hydrated ruthenium chloride (5.1 grams containing 38.83 percent Ru) and 100 ml. 2-ethoxyethanol are charged to a 300-ml. two-necked flask fitted with a carbon monoxide dip pipe, a reflux condenser and a Teflon-covered magnetic stirrer. Carbon monoxide is bubbled through the solution which is refluxed and stirred until it becomes pale yellow (approximately 2 hours). The heat is turned off and the solution is allowed to cool below 100° C. Ethanol (100 ml.) and 30 mesh granulated zinc (5.1 grams) are then added. The mixture is stirred and refluxed in a carbon monoxide stream until all the orange $Ru_3(CO)_{12}$ is precipitated (approximately 20 hours). The total reaction is completed in approximately 24 hours. On cooling, the crude product is isolated by filtration and extracted with 400 ml. of hot toluene which has been divided equally into six portions. The solution is then cooled in a Dry Ice box and filtered to give 3.2 grams (77 percent) of $Ru(CO)_{12}$ as orange crystals.

EXAMPLE 2

This example illustrated that decomposition occurs when the second stage is operated at greater than 100° C.

In a reaction system as described in Example 1, hydrated ruthenium chloride (2.0 grams) and 2-ethoxyethanol (75 ml.) are reacted at reflux with carbon monoxide to form a yellow solution. The solution is then treated with 30 mesh zinc (2.0 grams) and stirred and refluxed in a carbon monoxide stream. After a short time the solution darkens and a black precipitate is obtained which illustrates that extensive decomposition to ruthenium metal has occurred. Only trace amounts of $Ru_3(CO)_{12}$ are obtained.

EXAMPLE 3

This example shows that excessive reaction times are required when both stages of the reaction are run below 100° C.

Hydrated ruthenium chloride (5.0 grams containing 38.7 percent Ru) and ethanol (200 ml.) are charged to the 300 ml. flask in a reaction system as described in Example 1. After 4 days of refluxing and stirring in a stream of carbon monoxide, the solution becomes yellow. Granulated zinc (2.0 grams) is then added and the solution is refluxed and stirred in the carbon monoxide stream for 24 hours. On cooling, filtering, and extracting with hot toluene (360 ml.), 3.1 grams (76 percent) of recrystallized $Ru_3(CO)_{12}$ are obtained.

Although the invention has been described in considerable detail with particular reference to certain preferred embodiments thereof, variations and modifications may be effected within the spirit and scope of the invention.

We claim:

1. A process for producing a dodecacarbonyl product represented by the formula $M_3(CO)_{12}$ where M is selected from the group consisting of ruthenium and osmium which comprises the steps of (1) contacting a solution of a salt of ruthenium or osmium selected from the group consisting of halides, carbonyl halides or halide derivatives, in a first solvent with an excess of carbon monoxide at atmospheric pressure and at a temperature of from about 100° C. to about 150° C. until an intermediate metal carbonyl halide complex is formed, said first solvent being a nonreactive solvent for the starting salt of ruthenium or osmium and having a boiling point of from about 100° C. to about 150° C.; (2) adding to said first solution a quantity of a second solvent sufficient to lower the boiling point of the resultant solution to below 100° C. and at least a stoichiometric quantity of zinc, said second solvent being a solvent for the reactants, nonreactive with either the reactants or the products, and having a boiling point of less than 100° C.; and (3) contacting the resulting solution with additional carbon monoxide at about the boiling point of said resulting solution until precipitation of the dodecacarbonyl product is complete.

2. The process of claim 1 wherein both the first and the second solvent are nonsolvents for the dodecacarbonyl product.

3. The process of claim 1 wherein the zinc is added in a granulated form.

4. The process of claim 1 wherein the starting compound is a halide of ruthenium.

5. The process of claim 1 wherein the starting compound is ruthenium trichloride.

6. The process of claim 1 wherein the starting compound is a halide of osmium.

7. The process of claim 1 wherein the starting compound is osmium trichloride.

8. The process as claimed by claim 2 wherein the dodecacarbonyl product is separated from the reaction mixture by filtration.

9. A process for producing ruthenium dodecacarbonyl which comprises the steps of (1) contacting a solution of ruthenium trichloride in a high boiling alcohol with an excess of carbon monoxide at atmospheric pressure and at a temperature of from about 100° C. to about 150° C. until the color of the solution changes to pale yellow, said alcohol being a nonreactive solvent for ruthenium trichloride and having a boiling point of from about 100° C. to about 150° C.; (2) adding to said pale yellow solution a volume of a second solvent sufficient to lower the boiling point of the resultant solution to less than 100° C., and at least a stoichiometric quantity of zinc said second solvent being a solvent for the reactants, nonreactive with either the reactants or the products, and having a boiling point of less than 100° C.; and (3) contacting the resulting solution with additional carbon monoxide at about the boiling point of said resulting solution until precipitation of orange ruthenium dodecacarbonyl is complete.

10. The process of claim 9 wherein the zinc used is granulated zinc.

11. The process of claim 9 wherein the quantity of zinc is approximately equal in weight to the initial quantity of ruthenium trichloride.

12. The process of claim 9 wherein the first step of the reaction is conducted at a temperature of about 100° C. to about 135° C.

13. The process of claim 9 wherein both the first and second solvents are nonsolvents for the product triruthenium dodecacarbonyl.

14. The process of claim 9 wherein the product ruthenium dodecacarbonyl is separated from the solution by filtration.

15. The process of claim 9 wherein the first solvent has a boiling point of from about 105° C. to about 145° C.

16. The process of claim 9 wherein the first solvent is 2-ethoxyethanol.

17. The process of claim 9 wherein the second solvent is ethanol.

References Cited

UNITED STATES PATENTS

| 3,387,932 | 6/1968 | Pino et al. | 423—418 |
| 3,446,591 | 5/1969 | Pino et al. | 423—418 |
| 3,508,870 | 4/1970 | Bradford | 423—418 |
| 3,514,258 | 5/1970 | Stone et al. | 423—417 |
| 3,561,924 | 2/1971 | Candlin | 423—418 |
| 3,607,050 | 9/1971 | Chabardes | 423—418 |

EARL C. THOMAS, Primary Examiner